(12) United States Patent
Fujii et al.

(10) Patent No.: US 8,983,221 B2
(45) Date of Patent: Mar. 17, 2015

(54) IMAGE PROCESSING APPARATUS, IMAGING APPARATUS, AND IMAGE PROCESSING METHOD

(75) Inventors: Takashi Fujii, Osaka (JP); Yusuke Monobe, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 111 days.

(21) Appl. No.: 13/823,756

(22) PCT Filed: Aug. 8, 2012

(86) PCT No.: PCT/JP2012/005035
§ 371 (c)(1),
(2), (4) Date: Mar. 15, 2013

(87) PCT Pub. No.: WO2013/031102
PCT Pub. Date: Mar. 7, 2013

(65) Prior Publication Data
US 2013/0177260 A1    Jul. 11, 2013

(30) Foreign Application Priority Data
Aug. 29, 2011    (JP) .................. 2011-185491

(51) Int. Cl.
*G06K 9/40* (2006.01)
*G06T 7/00* (2006.01)
(Continued)

(52) U.S. Cl.
CPC ............. *G06T 7/00* (2013.01); *H04N 1/4092* (2013.01); *H04N 5/23267* (2013.01);
(Continued)

(58) Field of Classification Search
CPC ............. G06T 5/001; G06T 5/40; G06T 5/20; G06T 5/50; G06T 11/60; G06K 9/40; G06K 9/033; G06K 9/03; G06K 9/2009; H04N 5/23212; H04N 5/23258; H04N 1/0002; H04N 5/523248; H04N 5/523254

USPC ........ 382/254, 255, 274, 275, 299, 309, 115, 382/124; 356/124.5, 502; 348/79, 191, 189, 348/E17.005; 445/63; 349/95; 73/655
See application file for complete search history.

(56) References Cited

U.S. PATENT DOCUMENTS 5,790,709 A     8/1998  Kopeika et al. ............... 382/254
5,835,135 A *  11/1998  Hamaguri et al. ............. 348/191
(Continued)

FOREIGN PATENT DOCUMENTS

| JP | 2004-038362 | 2/2004 | ............ G06T 5/20 |
| JP | 2007-060520 | 3/2007 | ............ H04N 5/225 |
| JP | 2007-116332 | 5/2007 | ............ H04N 5/232 |

OTHER PUBLICATIONS

International Search Report issued Oct. 9, 2012 in International (PCT) Application No. PCT/JP2012/005035.
(Continued)

*Primary Examiner* — Anh Do
(74) *Attorney, Agent, or Firm* — Wenderoth, Lind & Ponack, L.L.P.

(57) ABSTRACT

An image processing apparatus which estimates a point spread function (PSF) of at least one input image, and the image processing apparatus includes: an S/N ratio estimation unit which estimates an S/N ratio of the input image at each spatial frequency; a restricted range calculation unit which calculates a restricted range that is a range of the spatial frequency in which the frequency component of the input images are restricted and that more likely includes a spatial frequency in which the S/N ratio is lower; a frequency restriction unit which generates a restricted image by restricting a frequency component of the input image within the restricted range; and a PSF estimation unit which estimates the PSF of the input image, using the restricted image.

18 Claims, 14 Drawing Sheets

(51) Int. Cl.
*H04N 1/409* (2006.01)
*H04N 5/232* (2006.01)
*G06T 5/00* (2006.01)
*G06T 5/10* (2006.01)

(52) U.S. Cl.
CPC .............. *G06T 5/003* (2013.01); *G06T 5/10* (2013.01); *G06T 7/0069* (2013.01); *G06T 2207/20056* (2013.01); *G06T 2207/20201* (2013.01)
USPC .......... 382/254; 382/255; 382/274; 382/275; 382/299

(56) References Cited

U.S. PATENT DOCUMENTS

| | | | | |
|---|---|---|---|---|
| 7,262,861 | B1* | 8/2007 | Pepper et al. | 356/502 |
| 8,204,282 | B2* | 6/2012 | Morita et al. | 382/124 |
| 2008/0218624 | A1 | 9/2008 | Furuki et al. | 348/345 |

OTHER PUBLICATIONS

Rob Fergus et al., "Removing Camera Shake from a Single Photograph", ACM Transactions on Graphics, vol. 25, Issue 3, Jul. 2006, p. 787-794.

* cited by examiner (a) Tilted black and white edge (b) Frequency characteristics of lens (a) Captured image of object (b) Frequency characteristics of object (a) Flat image (b) Frequency characteristics of noise

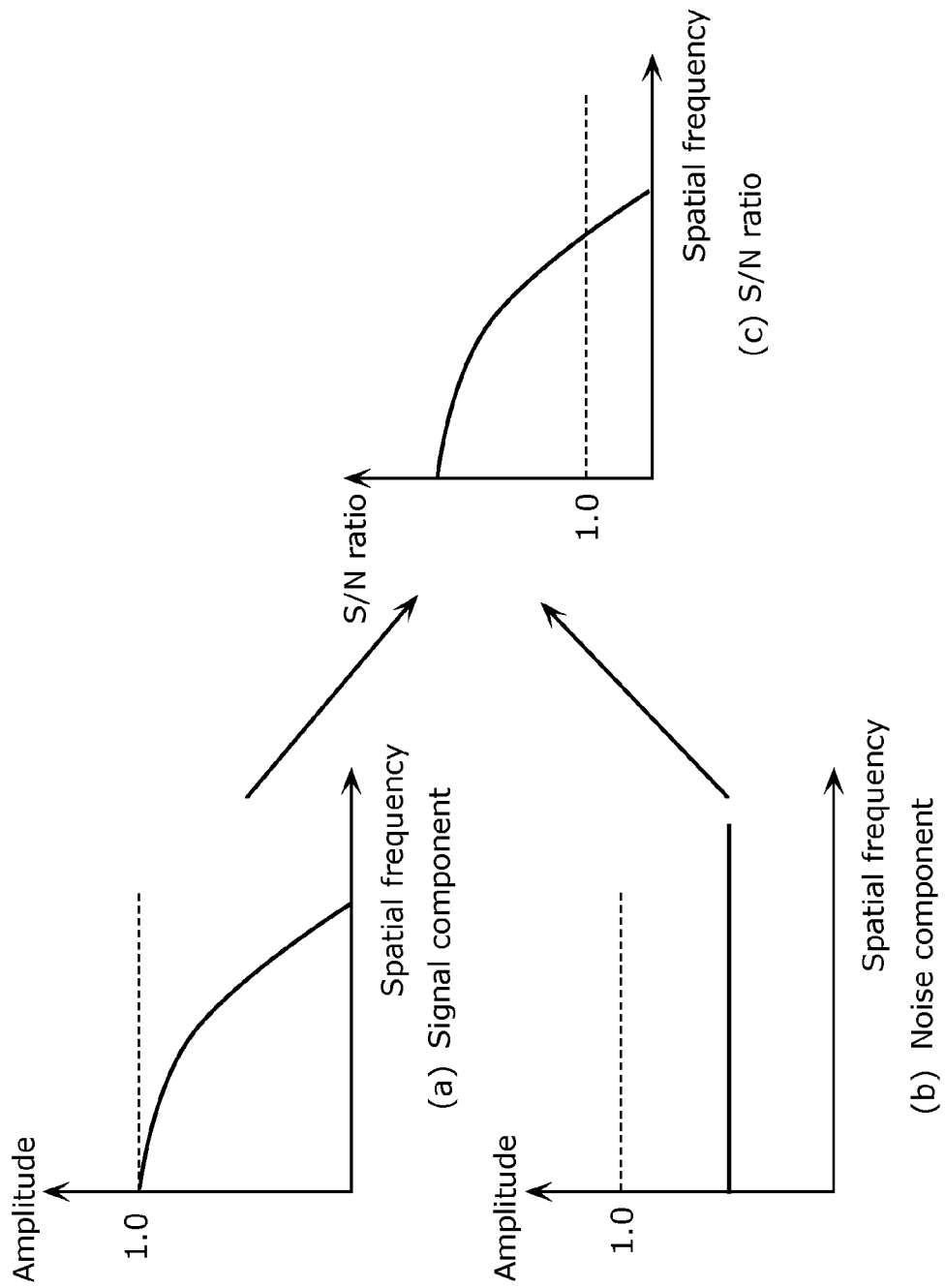

FIG. 13
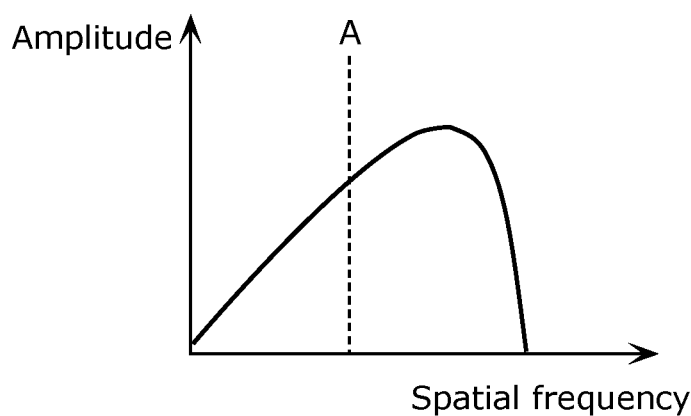
(a) Difference in frequency component
of PSF from distance K to distance L
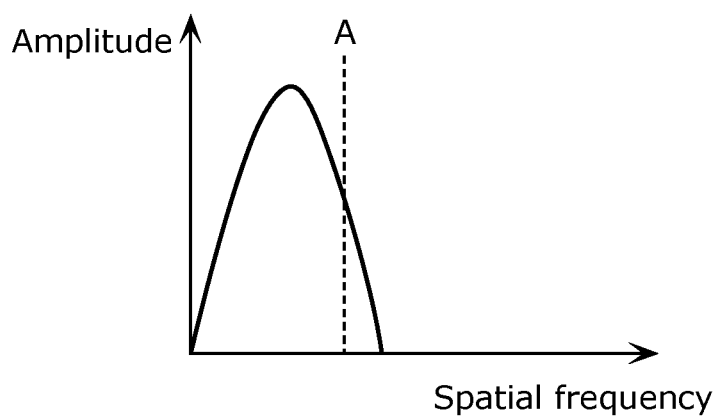
(b) Difference in frequency component
of PSF from distance M to distance N

IMAGE PROCESSING APPARATUS, IMAGING APPARATUS, AND IMAGE PROCESSING METHOD

TECHNICAL FIELD

The present invention relates to a technique for estimating a Point Spread Function (PSF) in an input image.

BACKGROUND OF THE INVENTION

In recent years, the total number of pixels in an imaging element included in a digital still camera and a digital video camera has been increasing rapidly, and the resolution of captured images has been improved. However, the large number of pixels reduces the light reception amount per pixel, with the result that noise in the captured images has increased.

The extension of exposure time is effective for suppressing the noise. However, when the exposure time is longer, camera shake blur and motion blur are easier to take place and the quality of the capture images is reduced.

Therefore, a technique has been proposed for removing camera shake blur and motion blur from a captured image with reduced quality (refer to Patent Literature 1 and Non Patent Literature 1). In the methods according to Patent Literature 1 and Non Patent Literature 1, an image in which camera shake blur and motion blur are removed is generated by performing a restoration process on a captured image using a Point Spread Function (PSF).

PSF is a function which shows the states of camera shake blur, motion blur, and out-of-focus blur. It should be noted that hereafter, the camera shake blur and motion blur are collectively referred to as blur.

Moreover, there is a case where a distance of the captured image is estimated using PSF. For example, there is a technique called Depth from Defocus (DFD) in which a distance is measured based on PSF which changes depending on the distance. More specifically, for example, the PSF of the defocus image is estimated using two images of all-in-focus image which is in focus and a defocus image in which is out of focus, and a distance is estimated by comparison between the estimated PSF and the PSF that is previously measured for each distance to the object.

The PSF used for image restoration and distance estimation is often estimated using a captured image which is transformed into a frequency range by Discrete Fourier Transform (DFT). In the case of DFD, an all-in-focus image which is in focus and a defocus image are obtained. The defocus image matches an image obtained by convoluting the PSF into the all-in-focus image. In other words, each of the frequency components for the defocus image matches the product of each of the frequency components for the all-in-focus image and each of the components for the PSF. Therefore, each of the frequency components for the PSF, for example, can be obtained by dividing each of the frequency components for the all-in-focus image by each of the frequency components for the defocus image.

CITATION LIST

Patent Literature

[PTL 1]
Japanese Unexamined Patent Application Publication No. 2007-116332

Non Patent Literature

[NPL 1]
R. Fergus, B. Singh, A. Hertzmann, S. T. Roweis, W. T. Freeman, "Removing Camera Shake from a Single Photograph", ACM Trans. on Graphics, Vol. 25, Issue 3, pp. 787-794 (2006)

SUMMARY OF INVENTION

However, there are cases where PSF cannot be accurately estimated by the above described PSF estimation method.

Therefore, the present invention provides an image processing apparatus which can improve the PSF estimation accuracy.

An image processing apparatus according to an aspect of the present invention is an image processing apparatus which estimates a point spread function (PSF) of at least an input image, the image processing apparatus comprising: an S/N ratio estimation unit configured to estimate an S/N ratio of the input image at each spatial frequency; a restricted range calculation unit configured to calculate a restricted range which more likely includes a spatial frequency in which the S/N ratio is lower, the restricted range being a range in which a frequency component of the input image is restricted, the range being of the spatial frequency; a frequency restriction unit configured to generate a restricted image by restricting a frequency component of the input image within the restricted range; and a PSF estimation unit configured to estimate the PSF of the input image, using the restricted image.

It should be noted that the general and specific aspects may be implemented using an apparatus, a system, an integrated circuit, a computer program, or a non-transitory recording medium such as a computer-readable medium such as a Compact Disc Read Only Memory (CD-ROM), or any combination of systems, methods, integrated circuits, computer programs, or computer-readable recording media.

With an image processing apparatus according to an aspect of the present invention, the PSF estimation accuracy can be improved.

BRIEF DESCRIPTION OF DRAWINGS

FIG. 5 is a diagram for describing a method for estimating an S/N ratio for each of the frequency components.

FIG. 13 is a diagram for describing the fact that a difference varies for each of the PSF frequency components depending on a distance interval.

Figure 1:
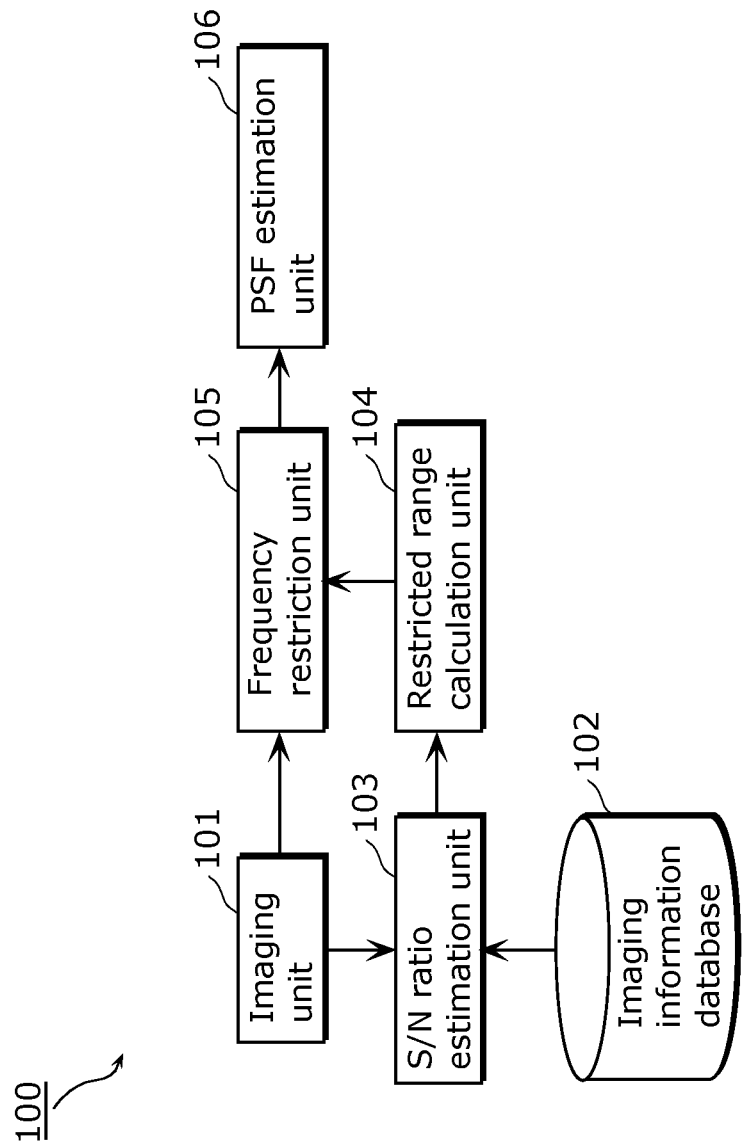
FIG. 1 is a diagram showing a configuration of an imaging apparatus according to Embodiment 1.

DETAILED DESCRIPTION OF INVENTION (Underlying Knowledge Forming Basis of the Present Invention)

The inventors found the following problem about the PSF estimation described in the column of Background Art.

When PSF is estimated, the PSF estimation accuracy is thought to significantly vary depending on a signal to noise ratio (S/N ratio) for a defocus image used for estimation.

A case where PSF is estimated in DFD is considered. When a signal component is small in an image in which the object is captured (when there is no edge and an image is flat), it is difficult to estimate the PSF. This is because, since the signal component is small and the amplitude for each of the frequency components of an all-in-focus image is small, there is a small difference with each of the frequency components of the defocus image.

Moreover, when the light amount is small, noise component is dominant in the captured image and it is difficult to estimate PSF. This is because, since the frequency component of the all-in-focus image and the frequency component of the defocus image are buried in noise component, the difference between the frequency components is not accurate.

As seen from the above, when a signal component is large (there are many edges) and there is little noise in the object to be imaged, each of the PSF frequency components is thought to be accurately estimated.

Generally, the amplitude of a signal component of the captured image is larger when a frequency is lower, and the amplitude of a signal component of the captured image is smaller when a frequency is higher. This is because when an image is captured by a camera, a high frequency component is reduced by a diffraction limit determined by a frequency characteristic of a lens (Modulation Transfer Function: MTF) and an f-number of the lens. Moreover, this is also because there is a feature that a natural image does not include a high frequency component very much.

Meanwhile, noise component of the captured image is dominated by photon shot noise which has a feature of white noise. Therefore, in the frequency component other than a DC component, the size of the amplitude of noise component is thought to be even.

As described above, when the signal component and the noise component are compared, there is a feature that the ratio of signal component is larger and the S/N ratio is higher when the frequency component is lower. On the other hand, when the signal component and the noise component are compared, there is a feature that the ratio of noise component is higher and the S/N ratio is lower in the case where the frequency component is higher.

As described above, the PSF estimation for each of the spatial frequencies from a relationship between the signal component and the noise component in a general captured image is thought to be easier when it is in a lower frequency range having a higher S/N ratio, and is thought to be more difficult when it is in a higher frequency range having a lower S/N ratio. Especially, when the amount of the noise component is large, it is difficult to estimate PSF in the high frequency component because the signal component is fully buried in the noise component. In this case, the estimation of a PSF frequency component for a high frequency is waste of calculation time, and this is a reason for reducing the PSF estimation accuracy.

An image processing apparatus according to an aspect of the present invention is an image processing apparatus which estimates a point spread function (PSF) of at least one input image, the image processing apparatus comprising: an S/N ratio estimation unit configured to estimate an S/N ratio of the input image at each spatial frequency; a restricted range calculation unit configured to calculate a restricted range which more likely includes a spatial frequency in which the S/N ratio is lower, the restricted range being a range in which a frequency component of the input image is restricted, the range being of the spatial frequency; a frequency restriction unit configured to generate a restricted image by restricting a frequency component of the input image within the restricted range; and a PSF estimation unit configured to estimate the PSF of the input image, using the restricted image.

With this configuration, it is possible to restrict a frequency component of an input image within a restricted range which is calculated to be included in the restricted range when the S/N ratio is lower at the spatial frequency. Furthermore, the PSF can be estimated using the restricted image which is restricted in such a manner. Therefore, it is possible to restrict reduction in the PSF estimation accuracy by a frequency component having much noise. Furthermore, since a frequency component for use in estimating PSF is reduced, the processing load for estimating PSF can be reduced or the processing time for estimating PSF can be shortened.

For example, the restricted range calculation unit may be configured to calculate, as the restricted range, a range of a frequency that is higher than a spatial frequency at which the S/N ratio matches a threshold.

With this configuration, it is possible to calculate, as a restricted range, the range having a frequency that is higher than a spatial frequency at which the S/N ratio matches a threshold. Since the S/N ratio is generally higher in the case of a high frequency range, it is possible to easily calculate an appropriate restricted range by calculating the restricted range in this way.

For example, the restricted range calculation unit may be configured to calculate, as the restricted range, a range of a spatial frequency at which the S/N ratio is less than a threshold.

With this configuration, it is possible to calculate, as a restricted range, the range of a spatial frequency having an S/N ratio that is less than a threshold. Therefore, it is possible to calculate a more appropriate restricted range.

For example, the PSF estimation unit may be configured to estimate the PSF for each range in the input image, and the image processing apparatus may further comprise a distance estimation unit configured to estimate a distance in a captured scene of the input image, using the PSF estimated for each range.

With this configuration, it is possible to estimate a distance in a captured scene of an input image using the estimated PSF.

For example, the image processing apparatus may further comprise a distance information database which stores a plurality of frequency characteristics of PSFs including the PSF each corresponding to one of a plurality of distances, wherein the restricted range calculation unit is configured to calculate the restricted range for including the spatial frequency in the restricted range (i) when the S/N ratio is lower at the spatial frequency and (ii) when a difference between frequency components in the frequency characteristics of the PSFs stored in the distance information database is smaller at the spatial frequency.

With this configuration, it is possible to calculate a restricted range which more likely includes a spatial frequency when the difference in frequency component in a plurality of frequency characteristics of the PSFs stored in the distance information database is smaller at the spatial frequency. When the difference in frequency component is larger, the distance estimation accuracy is higher in the spatial frequency. Therefore, since the restricted range can be calculated for the spatial frequency effective for estimating a distance not to be included in the restricted range, the distance estimation accuracy can be enhanced.

For example, the image processing apparatus may further comprise a distance information database which stores a plurality of frequency characteristics of PSFs including the PSF each corresponding to one of a plurality of distances, wherein the at least one input image includes a first input image, and a second input image which is less blurred than the first input image, and the PSF estimation unit is configured to: calculate a difference between (i) a restricted image of the first input image and (ii) a convolution image obtained by performing a convolution operation using the PSF stored in the distance information database on a restricted image of the second input image; and estimate a PSF of the first input image by selecting one of the PSFs stored in the distance information database, based on the calculated difference.

With this configuration, it is possible to select an appropriate PSF from the plurality of PSFs, based on the difference between (i) the restricted image of the first input image and (ii) the convolution image obtained by performing a convolution operation using PSF on the restricted image of the second input image.

For example, the S/N ratio estimation unit may be configured to estimate: a signal component of the input image at each spatial frequency, based on at least one of a frequency characteristic of a lens used in capturing the input image and a frequency characteristic of an object included in the input image; a noise component of the input image at each spatial frequency, based on a frequency characteristic of noise in an imaging element used in capturing the input image; and an S/N ratio of the input image at each spatial frequency, by calculating a ratio of the signal component to the noise component for each spatial frequency.

With this configuration, since it is possible to appropriately estimate the signal component and the noise component, it is possible to improve the estimation accuracy for the S/N ratio.

For example, the image processing apparatus may further comprise an imaging information database which stores a plurality of frequency characteristics of noise each corresponding to one of a plurality of luminance values, wherein the S/N ratio estimation unit is configured to obtain, from the imaging information database, the frequency characteristic of the noise corresponding to one of the luminance values of the input image, and to estimate the noise component of the input image at each spatial frequency, based on the obtained frequency component of the noise.

With this configuration, it is possible to appropriately estimate the noise component depending on the luminance value of the input image.

For example, the at least one input image may include a plurality of input images, and the S/N ratio estimation unit may be configured to estimate a signal component at each spatial frequency from an input image having a small blur radius among the input images.

With this configuration, it is possible to estimate a signal component in each of the spatial frequencies from a small blurred input image.

For example, the frequency restriction unit may be configured to restrict a frequency component of the input image within the restricted range by reducing the input image in size.

With this configuration, it is possible to restrict the frequency component of the input image within the restricted range by reducing the input image in size.

For example, the frequency restriction unit may be configured to restrict a frequency component of the input image within the restricted range by calculating a frequency component at only a spatial frequency out of the restricted range in frequency conversion on the input image.

With this configuration, the frequency of the input image within the restricted are is restricted by calculating the frequency component for only the spatial frequency out of the restricted range in frequency conversion on the input image. In other words, since there is no need to calculate the frequency component of the spatial frequency within the restricted range in frequency conversion on the input image, it is possible to reduce the processing load or the processing time for the frequency conversion.

For example, the at least one input image may include a plurality of input images, the restricted range calculation unit may be configured to calculate the restricted range for each of the input images and merge the calculated restricted ranges into a single restricted range, and the frequency restriction unit may be configured to restrict a frequency component for each of the input images, using the merged single restricted range.

With this configuration, it is possible to merge a plurality of restricted ranges calculated from a plurality of input images into a single restricted range. Therefore, it is possible to further restrict the inclusion in the restricted range of a spatial frequency having a low S/N ratio, and to improve the PSF estimation accuracy.

For example, the distance estimation unit may be configured to: merge a plurality of PSFs stored in the distance information database in which when the restricted range is larger, a total number of PSFs for estimating a distance is smaller; and estimate the distance using the merged PSF.

With this configuration, it is possible to merge the plurality of PSFs for estimating the distance stored in the distance information database after considering that the distance specification accuracy is lower when the restricted range is larger. Therefore, it is possible to improve the distance estimation accuracy.

For example, the distance estimation unit may be configured to: merge a plurality of PSFs stored in the distance information database in which when a distance is closer to an infocus position, a total number of PSFs corresponding to a vicinity of a position at the distance is smaller; and estimate the distance using the merged PSF.

With this configuration, it is possible to merge the plurality of PSFs for estimating the distance stored in the distance information database after considering that the distance specification accuracy is lower when the distance is closer to the focal length. Therefore, it is possible to improve the distance estimation accuracy.

An imaging apparatus according to an aspect of the present invention is an imaging apparatus which captures an input image, and includes the above described image processing apparatus.

It should be noted that the general and specific aspects may be implemented using a system, an integrated circuit, a computer program, or a non-transitory recording medium such as a computer-readable medium such as a CD-ROM, or any combination of systems, methods, integrated circuits, computer programs, or computer-readable recording media.

The following will describe embodiments with reference to the drawings.

It should be noted that the following embodiments to be described show general and specific examples. The numerical values, shapes, materials, structural elements, the arrangement positions and connection forms of the structural elements, steps, the processing order of the steps, and the like are mere examples, and therefore do not limit the scope of the appended Claims and their equivalents. Moreover, among the structural elements in the following embodiments, structural elements not recited in any one of the independent claims showing the most generic element are described as arbitrary structural elements.

[Embodiment 1]

The following will describe an imaging apparatus according to Embodiment 1 with reference to the drawings.

FIG. 1 is a block diagram of an imaging apparatus 100 according to Embodiment 1. As shown in FIG. 1, the imaging apparatus 100 includes an imaging unit 101, an imaging information database 102, an S/N ratio estimation unit 103, a restricted range calculation unit 104, a frequency restriction unit 105, and a PSF estimation unit 106. In the present embodiment, the imaging apparatus 100 estimates the PSF of an input image captured by the imaging unit 101. The following will describe each of the structural elements of the imaging apparatus 100 according to the present embodiment with reference to FIG. 1.

The imaging unit 101 generates image data (input image) by converting an optical image of the object into a digital signal. Then, the imaging unit 101 outputs the input image to the S/N ratio estimation unit 103 and the frequency restriction unit 105.

The imaging unit 101 includes a lens (not illustrated) which refracts light from the object and converge it, an aperture (not illustrated) which adjusts the amount of passing light and a depth of field, a shutter (not illustrated) which adjusts the time of light reception, and an imaging element (not illustrated) which converts an optical image into a digital signal.

The imaging unit 101, when capturing an image of the object, can capture an appropriate input image by adjusting camera parameters (for example, shutter speed, aperture value, and ISO speed), depending on the light amount and the motion amount of the object. The camera parameters are outputted to the S/N ratio estimation unit 103 and are used for estimating the S/N ratio of the input image.

The imaging unit 101 may not only capture an input image but also a plurality of input images successively. At that time, the imaging unit 101 may capture each of the input images by changing the camera parameters for a corresponding one of the input images. For example, when two input images are captured successively, the aperture value may be large when the first input image is captured, and the aperture value may be small when the second input image is captured. With this, two input images having different depths of field in the same scene are captured.

The imaging information database 102 is, for example, a hard disk drive (HDD), a semiconductor memory, and the like. The imaging information database 102 stores a variety of frequency characteristics that are previously measured. More specifically, the imaging information database 102, for example, the frequency characteristics of a lens included in the imaging unit 101, the frequency characteristics of an object to be imaged, and the frequency characteristics of noise in an imaging element included in the imaging unit 101.

In the present embodiment, the imaging information database 102 stores, as the frequency characteristics of the lens, an MTF value of the lens included in the imaging unit 101 or a diffraction limit value corresponding to an f-number, for each of the image heights and the frequency components. More specifically, the imaging information database 102 stores, as the frequency characteristics of the lens, a spatial frequency response (SFR) measured using, for example, the ISO 12233 resolution chart. In the image obtained by capturing a tilted black and white edge as shown in (a) of FIG. 2, by performing Discrete Fourier Transform (DFT) on a differential value of a changed amount of luminance values from white to black, the SFR can be calculated as the frequency characteristics like (b) of FIG. 2. In the input image, when the pixel value changes dramatically, the differential value and the amplitude of a high frequency component of SFR are greater.

It should be noted that the frequency characteristics of the lens are changed according to an aperture value and other camera parameters. Therefore, by measuring the frequency characteristics of the lens for each of the camera parameters, the accuracy of the frequency characteristics of the lens can be improved further. Here, in the frequency characteristic of the lens, the amplitude of a DC component is normalized at 1.0.

Figure 3:
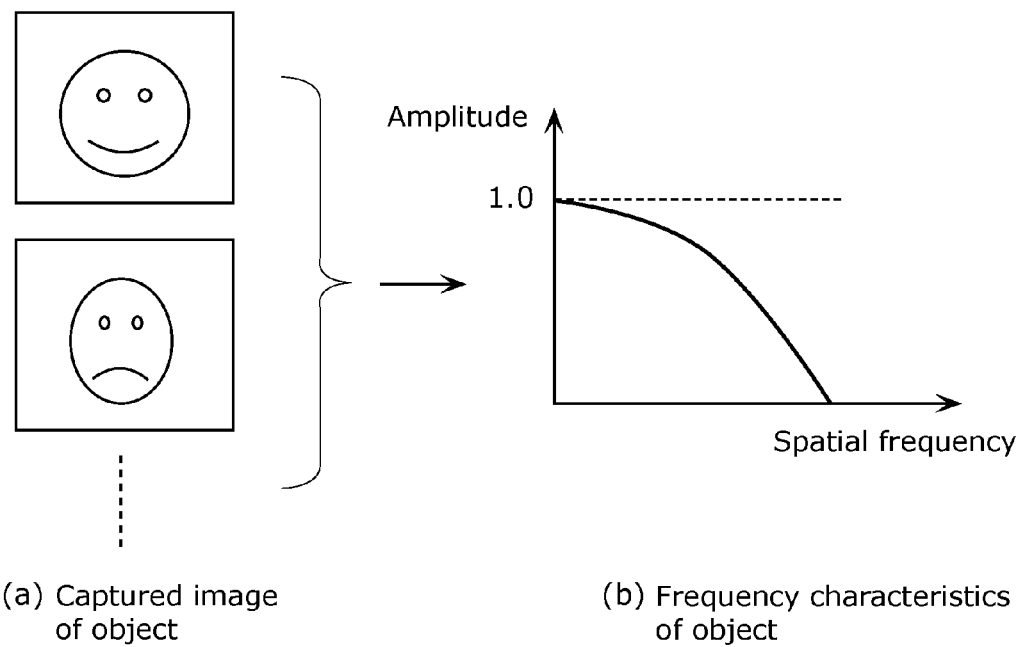
FIG. 3 is a diagram for describing a method for calculating frequency characteristics for an object that is an imaging target.

In the present embodiment, the imaging information database 102 stores, as the frequency characteristics of an object to be imaged, the frequency characteristics measured from the images of the object that are previously captured. For example, assume that the imaging apparatus 100 is a monitoring camera and the object to be imaged is a person. A plurality of images of a person in which the light amount is sufficient and there is little noise, as shown in (a) of FIG. 3, are obtained. By averaging the images and performing discrete Fourier transform on the images, the rough frequency characteristics of the object can be obtained as shown in (b) of FIG. 3. Moreover, by performing the same process after obtaining camera shake blurred images, the rough frequency characteristics of the camera shake blurred images can be obtained.

It should be noted that the frequency characteristics of the object to be imaged are different depending on the camera parameters such as a shutter speed. Therefore, by measuring the frequency characteristics of the object to be imaged for each of the camera parameters, the accuracy can be further improved. Moreover, when the object to be imaged is not especially determined, it is possible to use the characteristics of a natural image (characteristics in which the amplitude of the frequency component is in inverse proportion to the spatial frequency). Here, in the frequency characteristics of the object to be imaged, the amplitude of a DC component is normalized at 1.0.

Figure 4:
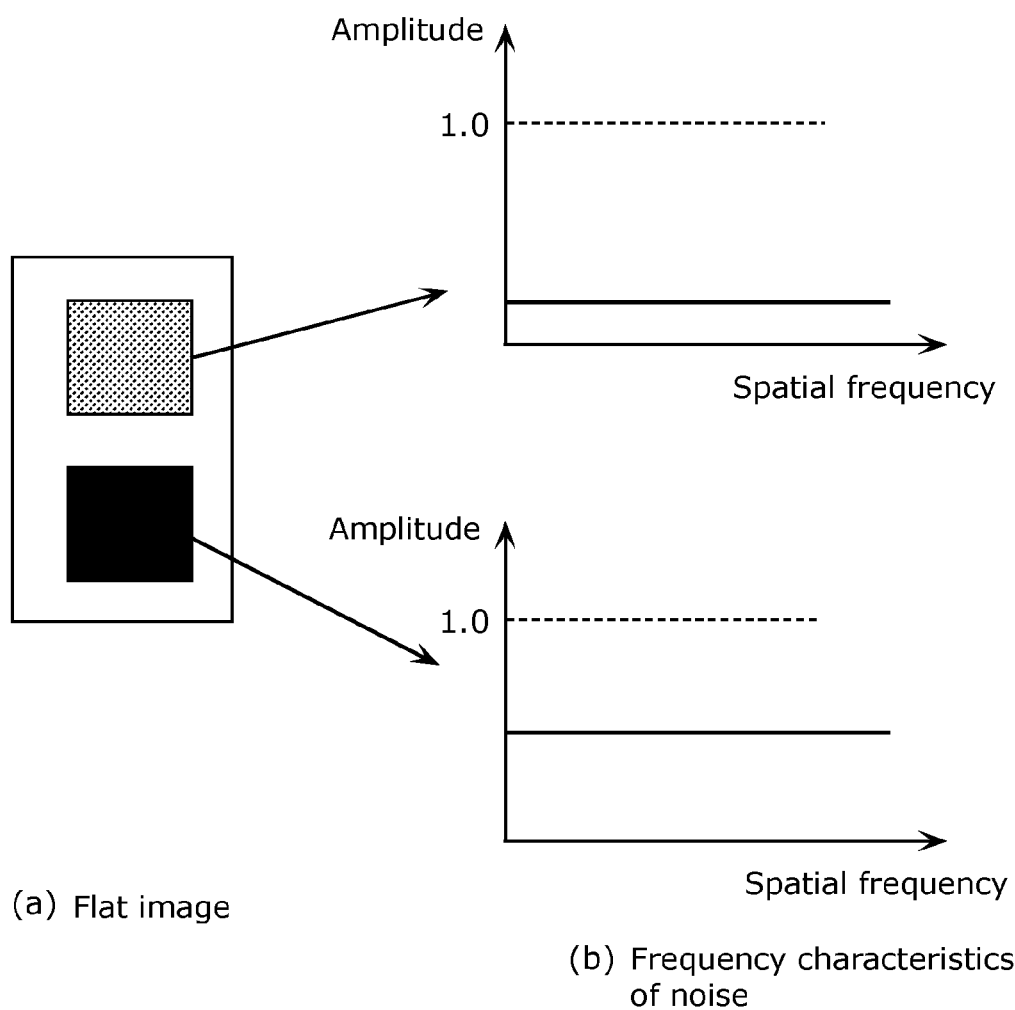
FIG. 4 is a diagram for describing a method for calculating frequency characteristics of noise of an imaging element.

Moreover, in the present embodiment, the imaging information database 102, as the frequency characteristics of the noise in the imaging element, stores a plurality of frequency characteristics of noise each corresponding to a corresponding one of the luminance values that are previously measured. For example, by performing discrete Fourier transform on an image obtained by capturing the object having a flat luminance without edge as shown in (a) of FIG. 4, the frequency characteristics of noise such as those in (b) of FIG. 4 can be obtained. Here, for each of the frequency components, the amplitude of a DC component is normalized at 1.0.

Photon shot noise having characteristics of a white noise is dominant. Therefore, the amplitude of frequency component of noise is thought to have an equal size except for the DC component. Therefore, the average of the amplitude of the frequency component except for the DC component can be treated as the amplitude of the frequency component of noise except for the DC component.

The photon shot noise has characteristics in which the noise amount is greater when the luminance value is higher. However, since the increment in DC component is greater than the increment in noise component, the amplitude of the frequency component except for DC component is smaller when being normalized. Moreover, due to the influence of dark current and the like, the amplitude is greater in the frequency component except for DC component when the luminance value is lower.

The S/N ratio estimation unit 103 estimates an S/N ratio of an input image in each of the spatial frequencies. Then, the S/N ratio estimation unit 103 outputs the estimated S/N ratio to the restricted range calculation unit 104.

In the present embodiment, the S/N ratio estimation unit 103 estimates a signal component and a noise component of an input image at each of the spatial frequencies. Then, the S/N ratio estimation unit 103 estimates the S/N ratio of the input image for each of the spatial frequencies, by calculating the ratio of a signal component to a noise component at each of the spatial frequencies.

First, an example of a method for estimating a signal component of an input image for each of the spatial frequencies will be described. The signal component is a component which corresponds to an optical image of the object among the components included in the input image. In other words, the signal component is a component in which the noise component is excluded from the components included in the input image.

Therefore, it is difficult to determine an accurate signal component from a single input image. However, there are several constraint conditions for the signal component included in the input image. Therefore, based on the constraint conditions, it is possible to estimate a rough signal component.

For example, the signal component included in the input image depends on the frequency characteristics of the lens. The S/N ratio estimation unit 103 may estimate a signal component of an input image for each of the spatial frequencies, based on the frequency characteristics of the lens. For example, the S/N ratio estimation unit 103 may determine the frequency characteristics of the lens as the signal component of the input image for each of the spatial frequencies.

Moreover, for example, the signal component included in the input image depends on the frequency characteristics of the object to be imaged. The S/N ratio estimation unit 103 may estimate a signal component of an input image for each of the spatial frequencies, based on the frequency characteristics of the object to be imaged. For example, the S/N ratio estimation unit 103 may determine the frequency characteristics of the object to be imaged as the signal component of the input image for each of the spatial frequencies.

Furthermore, the S/N ratio estimation unit 103 may estimate a signal component of an input image for each of the spatial frequencies, based on the two frequency characteristics (the frequency characteristics of the lens and the frequency characteristics of the object to be imaged). For example, the S/N ratio estimation unit 103 may determine a representative value for each of the spatial frequencies of the two frequency characteristics (for example, average, minimum value, or maximum value) as the signal component of the input image for each of the spatial frequencies. With this, the S/N ratio estimation unit 103 can estimate the signal component of the input image with higher accuracy.

It should be noted that the frequency characteristics of the signal component are changed by camera parameters to be set in the imaging unit 101. Therefore, the S/N ratio estimation unit 103 may obtain the frequency characteristics of the lens or the frequency characteristics of the object to be imaged which correspond to the camera parameters from the imaging information database 102. With this, the S/N ratio estimation unit 103 can estimate the signal component of the input image with higher accuracy.

Moreover, when the imaging unit 101 captures a plurality of input images, the S/N ratio estimation unit 103 may estimate a signal component in each of the spatial frequencies from a small blurred input image among the input images. In this case, the S/N ratio estimation unit 103 may determine the input image having a blurred image that is smaller than the blurred images in other input images, using, for example, the camera parameters set in the imaging unit 101 when each of the input images is imaged.

More specifically, the S/N ratio estimation unit 103, for example, may determine the input image having a blurred image that is smaller than the blurred images in other input images, using the aperture value set in the imaging unit 101 when each of the input images is imaged. For example, when the first input image having a large aperture value and the second input image having a small aperture value are captured, the S/N ratio estimation unit 103 may determine that the first input image has a blur that is smaller than the blur in the second input image.

Similarly, the S/N ratio estimation unit 103 may determine the input image having a camera shake blur and motion blur that are smaller than the camera shake blurs and motion blurs in other input images, using, for example, the shutter speed set in the imaging unit 101 when each of the input images is captured.

The S/N ratio estimation unit 103 estimates a signal component of an input image for each of the spatial frequencies, by performing discrete Fourier transform on the input image which is determined to have a small blur.

Next, an example of a method for estimating a noise component of an input image for each of the spatial frequencies will be described. The noise component is a component which does not correspond to an optical image of the object among the components included in the input image. In other words, the noise component is a component in which the signal component is excluded from the components included in the input image.

The S/N ratio estimation unit 103 obtains, from the imaging information database 102, the frequency characteristics of the noise which corresponds to the luminance value of the input image. The S/N ratio estimation unit 103 estimates a noise component of an input image for each of the spatial frequencies, based on the obtained frequency characteristics of the noise.

More specifically, the S/N ratio estimation unit 103 first calculates a representative luminance value of the input image captured by the imaging unit 101. The S/N ratio estimation unit 103 obtains, as the noise component of the input image from the imaging information database 102, the frequency characteristics of the noise which corresponds to the representative luminance value.

More specifically, the S/N ratio estimation unit 103, for example, calculates, as the representative luminance value of the input image, the average of the luminance values in the whole range of the input image or the average of the luminance values in the spot range of the input image. It should be noted that the average may be any kind of averages as long as it is a statistical average. For example, the average is an arithmetic mean value, a geometric mean value, a harmonic mean value, or a weighted average value. Moreover, the representative luminance value does not have to be an average of the luminance values, and may be a median or a mode. In other words, the representative luminance value may be a statistically representative value of the luminance values of the input image.

It should be noted that when a gain is applied to the input image, the S/N ratio estimation unit 103 may normalize the luminance value of the input image in order to be a luminance value of a specific ISO speed (for example, ISO 100), based on the information of the ISO speed obtained from the imaging unit 101.

Next, a method for estimating an S/N ratio in each of the spatial frequencies will be described. As shown in FIG. 5, the S/N ratio estimation unit 103 estimates an S/N ratio for each of the spatial frequencies based on a signal component and a noise component. More specifically, the S/N ratio estimation unit 103, for example, in each of the spatial frequencies, obtains an S/N ratio by dividing the amplitude of the signal component by the amplitude of the noise component.

In FIG. 5, in the low frequency range, since the amplitude of the signal component is larger than the amplitude of the noise component, the S/N ratio is a value greater than or equal to 1.0. In the high frequency range, however, since the amplitude of the signal component is smaller than the amplitude of the noise component, the S/N ratio is a value less than 1.0. As described above, the S/N ratio for each of the spatial frequencies dynamically changes depending on the signal component and the noise component.

The restricted range calculation unit 104 calculates a restricted range which is a range of the spatial frequency in which the frequency component of the input image is restricted and more likely includes the spatial frequency in which the S/N ratio estimated by the S/N ratio estimation unit 103 is lower. The restricted range calculation unit 104 outputs the calculated restricted range to the frequency restriction unit 105 and the PSF estimation unit 106.

For example, the restricted range calculation unit 104 calculates, as a restricted range, the range having a frequency that is higher than a spatial frequency at which an S/N ratio matches a threshold. In other words, the restricted range calculation unit 104 calculates, as a spatial frequency of a lower limit of the restricted range, a spatial frequency at which an S/N ratio matches a threshold.

Figure 6A:
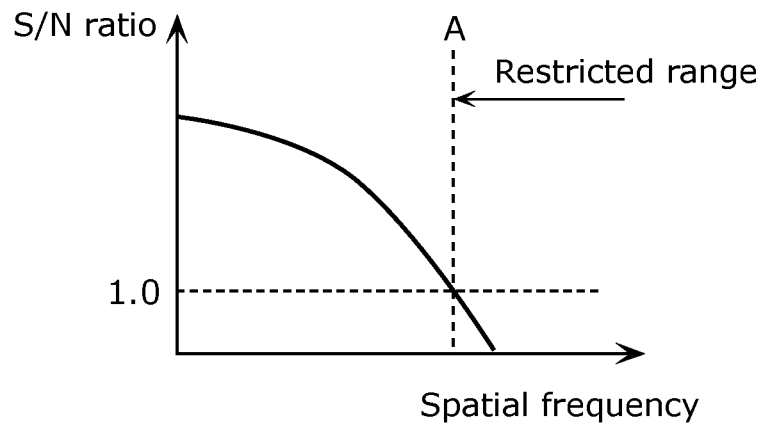
FIG. 6A is a diagram showing an example of a restricted range.

More specifically, as shown in FIG. 6A, for example, the restricted range calculation unit 104 calculates, as the spatial frequency of the lower limit of the restricted range, the largest frequency A among the spatial frequencies at which the S/N ratios match 1.0.

Moreover, for example, the restricted range calculation unit 104 calculates, as a restricted range, the range of a spatial frequency at which an S/N ratio is less than a threshold. In other words, the restricted range calculation unit 104 may calculate, as the spatial frequency indicating the restricted range, the spatial frequency for each of the start point and the end point of the range at which the S/N ratio is less than a threshold.

Figure 6B:
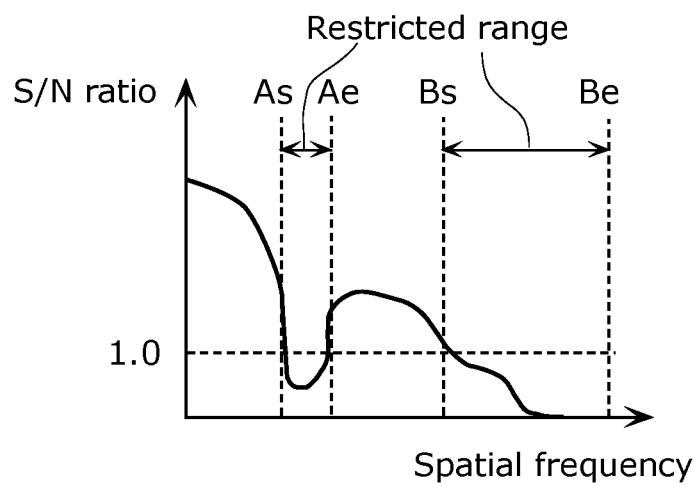
FIG. 6B is a diagram showing an example of another restricted range.

More specifically, the restricted range calculation unit 104, as shown in FIG. 6B, for example, calculates pairs of spatial frequencies (As, Ae) and (Bs, Be) for the start point and the end point of the range at which the S/N ratio is less than 1.0.

It should be noted that the threshold for calculating the restricted range is, for example, a value arbitrarily set by a user. When the threshold is greater, the restricted range is larger. Therefore, when the threshold is greater, the frequency component to be restricted is increased and therefore the effect of reducing computational load is greater.

When a plurality of input images are captured successively by the imaging unit 101, the restricted range calculation unit 104 calculates a restricted range for each of the input images. The restricted range calculation unit 104 merges the calculated restricted ranges into a single restricted range.

For example, when the imaging unit 101 captures two input images (the first input image and the second input image), assume that the restricted range in which the lower limit is the frequency A is calculated for the first input image and the restricted range in which the lower limit is the frequency B is calculated for the second input image. Here, the frequency B is lower than the frequency A. When the PSF is estimated from the two input images, it is difficult to estimate an accurate PSF without using a frequency component having a high S/N ratio for both input images. Therefore, in this case, the restricted range calculation unit 104 merges the two restricted ranges and calculates a restricted range in which the lower limit is the frequency B.

The frequency restriction unit 105 generates a restricted image by restricting the frequency component of an input image within the restricted range calculated by the restricted range calculation unit 104. Then, the frequency restriction unit 105 outputs the restricted image to the PSF estimation unit 106. It should be noted that restricting the frequency component of the input image within the restricted range means a process in which the input image is processed such that the frequency component within the restricted range is not included in the input image. Restricting the frequency component of the input image within the restricted range, for example, means exclusion of the frequency component within the restricted range from the input image.

Specifically, the frequency restriction unit 105, for example, restricts the frequency component of the input image within the restricted range by reducing the input image in size. More specifically, for example, when half of the frequency range in which the frequency component of the input image exists is a restricted range, the frequency restriction unit 105 reduces the size of the input image to half. For example, the frequency restriction unit 105 reduces the size of the input image, using the existing method such as bilinear interpolation.

Moreover, the frequency restriction unit 105 may restrict the frequency component of the input image within the restricted range by calculating the frequency component for only the spatial frequency out of the restricted range in frequency conversion on the input image. In other words, the frequency restriction unit 105 determines without calculation, as zero, the frequency component of the input image within the restricted range.

For example, an example of a method will be described for restricting the frequency component in Expression 1 of discrete Fourier transform which transforms n signals x (x0, ..., xn−1) into n frequency components f (f0, ... fn−1).

[Math. 1]

$$f_j = \sum_{k=0}^{n-1} x_k e^{-\frac{2\pi i}{n} jk}$$ (Expression 1)

For example, when the start point and the end point of the restricted range are frequency As and frequency Ae, respectively, the frequency restriction unit 105 does not calculate for $f_{As}$ to $f_{Ae}$ in Expression 1 and substitutes zero into a value showing the calculation results from $f_{As}$ to $f_{Ae}$. With this, the frequency restriction unit 105 can reduce calculation time for frequency conversion.

When the imaging unit 101 images the same object, the restricted range changes when the light amount changes. For example, when the light amount is low, the luminance value in the input image is smaller, the amplitude of the noise component is greater, and the S/N ratio of the high frequency component is lower. Therefore, the restricted range is set toward a low frequency and the high frequency component of the input image is restricted. Meanwhile, when the light amount is high, the luminance value in the input image is larger, the amplitude of the noise component is smaller, and the S/N ratio of the high frequency component is higher. Therefore, the restricted range is set toward a high frequency, and the high frequency component of the input image is restricted. The restricted frequency component dynamically changes depending on the luminance value of the input image.

When a plurality of input images are captured by the imaging unit 101, the restricted range calculation unit 104 restricts the frequency components of the input images, using a merged restricted range.

The PSF estimation unit 106 estimates the PSF of an input image, using the restricted image generated by the frequency restriction unit 105.

Various methods for estimating PSF have been proposed. For example, when PSF is estimated from a single image, the PSF estimation unit 106 may estimate PSF in the technique such as one disclosed in Non Patent Literature 1. Moreover, when PSF is estimated from a plurality of images like DFD, the PSF estimation unit 106 may estimate PSF by dividing each of the frequency components in an infocus image by each of the frequency components in a defocus image.

It should be noted that the restricted image is an image in which the frequency component of the input image within the restricted range is restricted. Therefore, the PSF estimation unit 106 cannot estimate the frequency component of the PSF within the restricted range. For example, when a range having a frequency greater than or equal to A is a restricted range, the restricted image does not have a frequency component having a frequency higher than the frequency A. Therefore, the PSF estimation unit 106 cannot estimate the frequency component having a frequency higher than the frequency A among the frequency components of the PSF. In other words, the range of the frequency component of the PSF estimated from the restricted image depends on the restricted range calculated by the restricted range calculation unit 104.

In the imaging unit 101, when input images are obtained, PSF is estimated for each of the input images. In the case of DFD, the PSF of an infocus image is determined as the PSF of a point without blur, and the PSF of a defocus image can be used as a function showing how much it is blurred with respect to the infocus image.

Next, an operation performed by the imaging apparatus 100 as configured above will be described.

Figure 7:
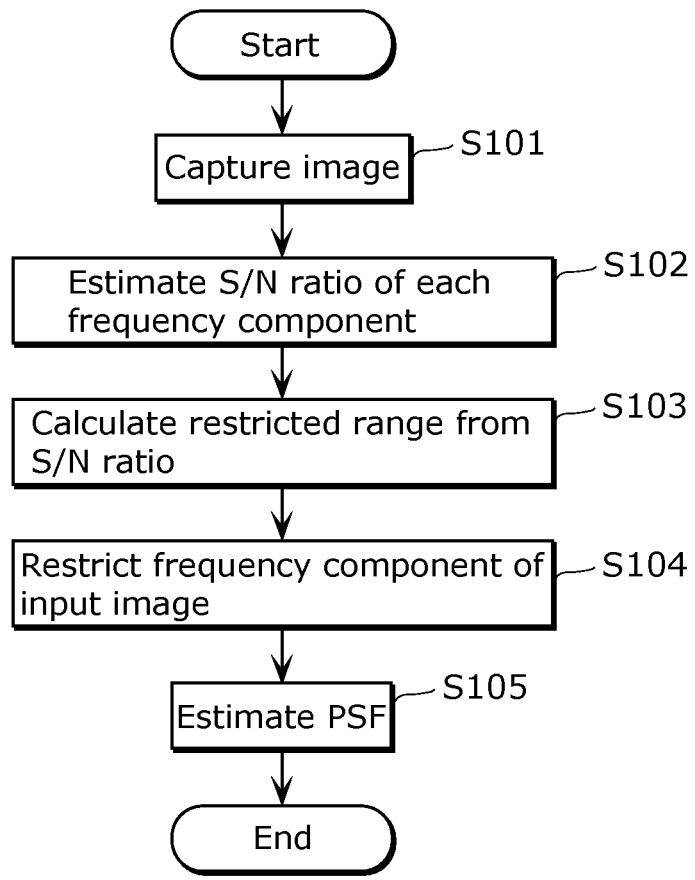
FIG. 7 is a flowchart showing processes performed by the imaging apparatus according to Embodiment 1.

FIG. 7 is a flowchart showing processes performed by the imaging apparatus 100 according to Embodiment 1. The following will describe the flow of processes according to Embodiment 1 with reference to FIG. 7.

In Step S101, the imaging unit 101 captures at least one input image. At this time, the imaging unit 101 may not only capture a single input image but also a plurality of input images.

In Step S102, the S/N ratio estimation unit 103 calculates an S/N ratio of an input image for each of the spatial frequencies. It should be noted that in Step S101, when a plurality of input images are captured, the S/N ratio estimation unit 103 estimates the S/N ratio for each of the input images.

In Step S103, the restricted range calculation unit 104 calculates the restricted range using the S/N ratio in each of the spatial frequencies that are estimated in Step S102. It should be noted that in Step S101, when a plurality of input images are captured, the restricted range calculation unit 104 calculates the restricted range for each of the input images and then merges the calculated restricted ranges.

In Step S104, the frequency restriction unit 105 generates a restricted image by restricting the frequency component of an input image within the restricted range calculated in Step S103. It should be noted that in Step S101, when a plurality of input images are captured, a plurality of restricted images are generated by restricting the frequency component for each of the input images, using a single restricted range generated through a merger in Step S103.

In Step S105, the PSF estimation unit 106 estimates the PSF of an input image, using the restricted image generated in Step S104.

By performing a restoration process on an input image using PSF estimated through the processes, an image in which blur is reduced compared with the input image can be obtained. Moreover, the estimated PSF may be used for calculating distance information in Embodiments 2 and 3 to be described later.

With the above described configuration, the imaging apparatus 100 according to the present embodiment can reduce calculation time for PSF estimation because it does not estimate PSF using a high frequency component from which is difficult to estimate PSF due to a large amount of noise. At that time, the imaging apparatus 100 can calculate an appropriate restricted range for restricting the frequency component which is not used for estimating PSF. With this, the imaging apparatus 100 can estimate PSF with high accuracy.

It should be noted that the imaging apparatus 100 performs various processes on the whole range of the input image, but may perform the processes on each part of the input image. More specifically, the S/N ratio estimation unit 103 may estimate an S/N ratio for each of the ranges in the input image. Moreover, the restricted range calculation unit 104 may calculate a restricted range for each of the ranges in the input image. Moreover, the frequency restriction unit 105 may, for each of the ranges in the input image, generate a restricted image by restricting the frequency component within the restricted range. Moreover, the PSF estimation unit 106 may estimate PSF for each of the ranges in the input image.

[Embodiment 2]

The following will describe Embodiment 2 with reference to the drawings.

Figure 8:
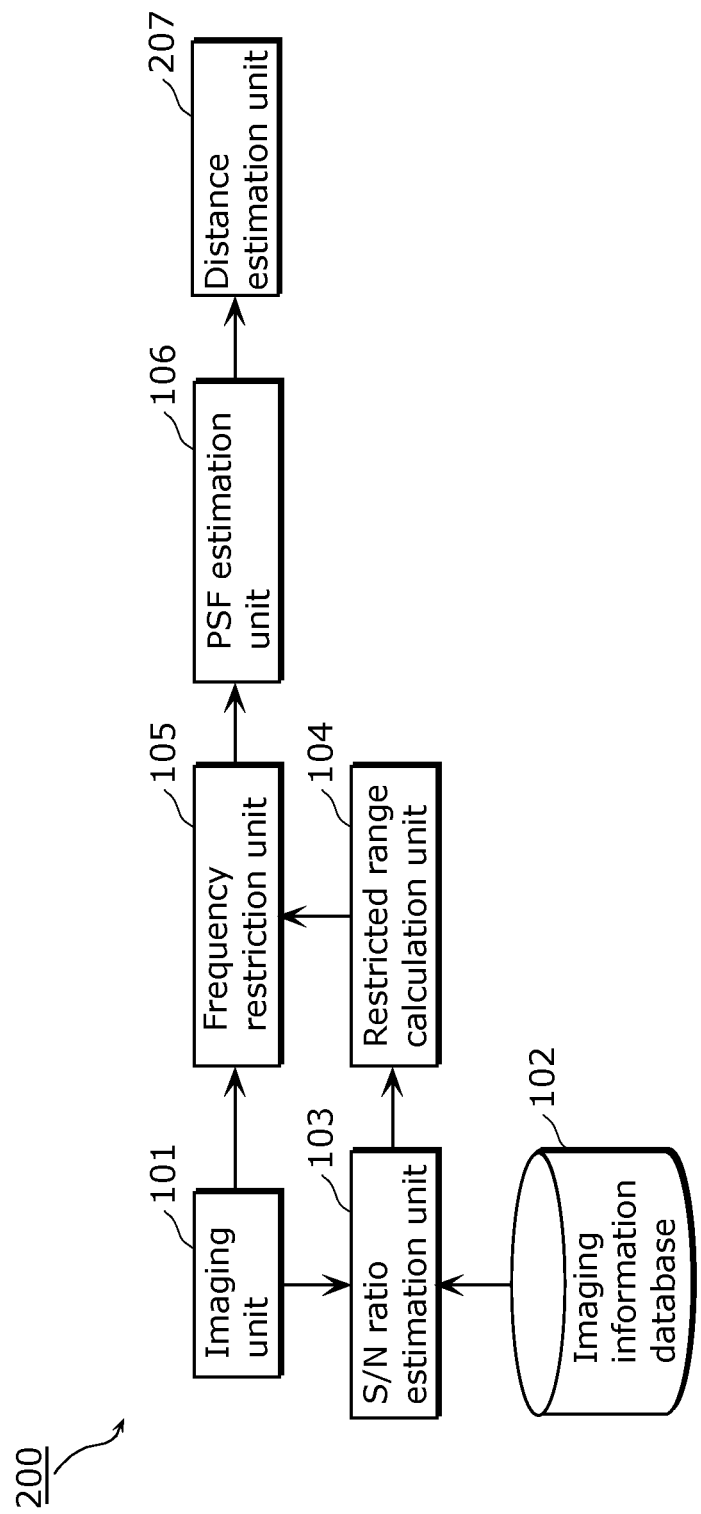
FIG. 8 is a diagram showing a configuration of an imaging apparatus according to Embodiment 2.

FIG. 8 is a diagram showing a configuration of an imaging apparatus 200 according to Embodiment 2. It should be noted that the same reference numbers are used for the same elements as the imaging apparatus according to Embodiment 1. A detailed description thereof will be omitted. The imaging apparatus 200 according to Embodiment 2 includes a distance estimation unit 207 in addition to the structural elements in Embodiment 1. The imaging apparatus 200 according to the present embodiment estimates distance information of captured scenes using PSFs estimated from a plurality of input images captured by the imaging unit 101. The following will describe each of the structural elements of the imaging apparatus 200 according to the present embodiment with reference to FIG. 8.

An imaging unit 101, an imaging information database 102, an S/N ratio estimation unit 103, a restricted range calculation unit 104, a frequency restriction unit 105, and a PSF estimation unit 106 perform the same processes as those in Embodiment 1. It should be noted that the imaging unit 101 captures a plurality of input images that are focused differently.

Moreover, the PSF estimation unit 106 estimates a PSF for each of the ranges in the input image. For example, the PSF estimation unit 106 estimates a PSF for each of the rectangular ranges which are obtained by dividing the input image.

The distance estimation unit 207 estimates a distance of the captured scene of the input image, using the PSF of the input image estimated for each of the ranges by the PSF estimation unit 106.

Here, a method for estimating a distance from two images that are differently focused (the first image and the second image) will be described. It is determined that an all-in-focus image having a large aperture value is the first image and an image having a small aperture value and focused on the front side is the second image. Moreover, it is determined that the PSF estimation unit 106 estimates the PSF for each of the ranges in the second image that is estimated using the first image.

First, the distance estimation unit 207 calculates a blur radius from the PSF for each of the ranges in the second image. It is found that the object exists on the front side since the object which exists in a range having a small blur radius is focused in the second image. Meanwhile, it is found that the object exists on the back side since the object which exists in a range having a large blur radius is not focused in the second image. In this way, the distance estimation unit 207 can estimate a distance for each of the ranges from a shape of the PSF for each of the ranges.

The total number of distances that can be specified by the distance estimation unit 207 is determined by the total number of thresholds of blur radii. For example, assume a case where a distance is specified using only one threshold X. In this case, when the blur radius of a range is less than the threshold X, the distance estimation unit 207 estimates the distance of the range to be a distance A. Moreover, when the blur radius of a range is greater than or equal to the threshold X, the distance estimation unit 207 estimates the distance of the range to be a distance B. In this way, when the total number of thresholds of the blur radius is one, the total number of distances that can be specified by the distance estimation unit 207 is two. When the total number of thresholds for specifying a distance is increased, the total number of distances that can be specified is increased but the specification accuracy per distance is reduced.

It should be noted that the distance estimation unit 207 may estimate a distance using PSF instead of the blur radius. With this, the distance estimation accuracy is further improved. For example, the distance estimation unit 207 calculates the sum of absolute values of the differences between PSF in a range estimated by the PSF estimation unit 106 and a group of PSFs previously measured for each of the distances. Then, the distance estimation unit 207 adopts the distance corresponding to the PSF having the smallest difference as a distance of the range. In this case, the total number of distances that can be specified by the distance estimation unit 207 is the same as the total number of PSFs that are previously measured for each of the distances.

[Embodiment 3]

The following will describe Embodiment 3 in detail with reference to the drawings.

Figure 9:
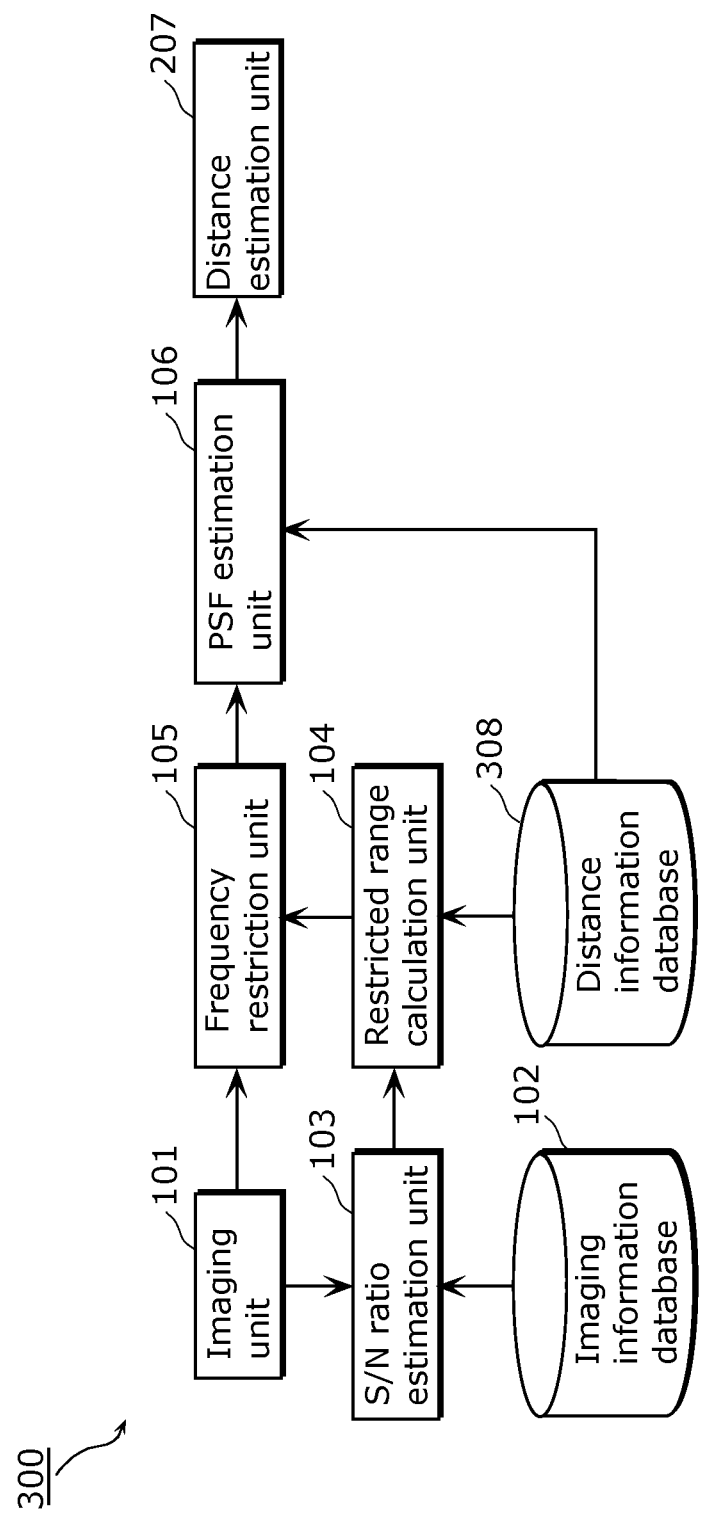
FIG. 9 is a diagram showing a configuration of an imaging apparatus according to Embodiment 3.

FIG. 9 is a diagram showing a configuration of an imaging apparatus 300 according to Embodiment 3. It should be noted that the same reference numbers are used for the same elements as in the imaging apparatus according to Embodiments 1 and 2, and a detailed description thereof will be omitted. The imaging apparatus 300 according to Embodiment 3 includes a distance information database 308 in addition to the structural elements in Embodiment 2. The imaging apparatus 300 according to the present embodiment estimates distance information of captured scenes using PSFs estimated from a plurality of input images captured by the imaging unit 101. The following will describe each of the structural elements of the imaging apparatus 300 according to the present embodiment with reference to FIG. 9.

An imaging unit 101, an imaging information database 102, an S/N ratio estimation unit 103, a frequency restriction unit 105, and a distance estimation unit 207 perform the same processes as those in Embodiment 2. The flow of processes according to the present embodiment is the same as the flow of processes according to Embodiment 2. A restricted range calculation unit 104 and a PSF estimation unit 106 according to the present embodiment perform the processes in a different way from those in Embodiments 1 and 2.

An distance information database 308 is, for example, a hard disk drive (HDD), a semiconductor memory, and the like. The distance information database 308 stores frequency characteristics of PSF showing blurs that are previously measured for each of the distances. In other words, the distance information database stores a plurality of frequency characteristics of PSFs corresponding to a corresponding one of the plurality of distances.

Figure 2:
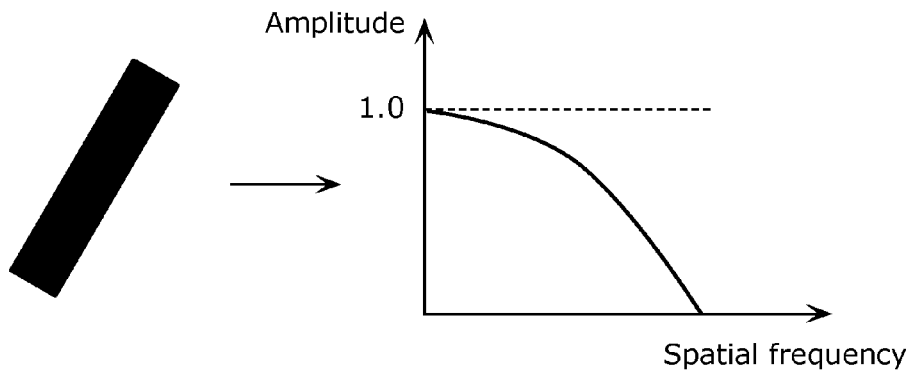
FIG. 2 is a diagram for describing a method for calculating a spatial frequency response (SFR).
Figure 10:
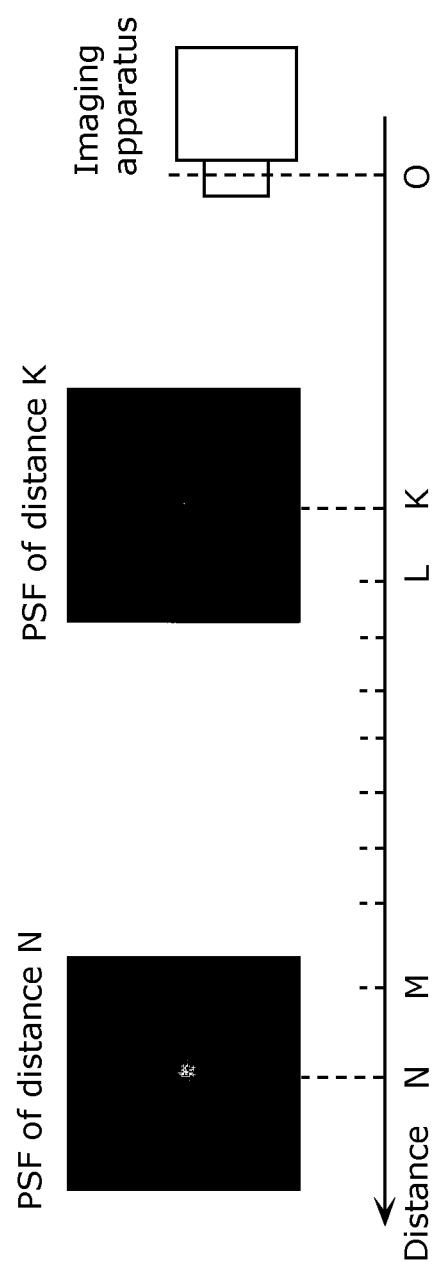
FIG. 10 is a diagram showing a relationship between the imaging apparatus and the PSF for each of the distances.

The frequency characteristics of the PSF can be obtained by calculating SFR for each of the distances, using images by capturing a tilted black-and-white edge as shown in (a) of FIG. 2 from a plurality of distances. As shown in FIG. 10, the lens principal point position of the imaging apparatus 300 is determined as a distance 0. Then, the focal position is adjusted such that the infocus position on the side of the object matches a distance K. Then, SFR is calculated from each of the images captured by moving the object from the distance K to a distance N. Specifically, first, in the interval from the distance K to the distance N, the SFR for each of the distances is measured by locating a tilted black and white edge as shown in (a) of FIG. 2 at a distance to be measured. The measured SFR is determined as the frequency characteristics of PSF for each of the distances. In the case of the distance K which matches the infocus position, the blur radius is smaller. In the case of the distance N away from the infocus position, the blur radius is greater.

The restricted range calculation unit 104 calculates a restricted range, using the S/N ratio for each of the spatial frequencies estimated by the S/N ratio estimation unit 103 and the frequency characteristics of PSF obtained from the distance information database 308. The restricted range calculation unit 104 outputs the calculated restricted range to the frequency restriction unit 105 and the PSF estimation unit 106.

It should be noted that the restricted range calculation unit 104 may obtain at least one frequency characteristic of PSF from a plurality of the frequency characteristics of the PSFs stored in the distance information database 308, corresponding to a distance interval to be set by the user. For example, when the captured scene is fixed as that in a monitoring camera, the distance interval is restricted in the captured scene. In that case, the restricted range calculation unit 104 may obtain only the frequency characteristics of PSF within the restricted distance interval from the distance information database 308.

An interval from the distance K to the distance N in FIG. 10 is determined as a distance interval to be set by the user. In this case, the total number of distances that can be specified is the same as the total number of PSFs that are previously measured within the interval from the distance K to the distance N. Since the blur radius at the distance K is small, the amplitude of a high frequency component of PSF is large as shown in (a) of FIG. 11. When the distance is longer, the blur radius is larger and the amplitude of a high frequency component of the PSF is smaller. Since the blur radius is large at the farthest distance N, the amplitude of a high frequency component is smaller as shown in (b) of FIG. 11.

When the distance from the distance K to the distance N is specified, it is easier for the distance estimation unit 207 to specify the distance when the difference in the frequency component of the PSF for each of the distances is greater. For example, in a low frequency component closer to a DC component, the difference between the frequency components of the PSF for each of the distances is smaller. Therefore, it is difficult for the distance estimation unit 207 to specify a distance using a low frequency component. Moreover, also in a high frequency component in which the amplitude is smaller at the distance K, the difference between the frequency components of the PSF for each of the distance is smaller. Therefore, it is difficult for the distance estimation unit 207 to specify a distance using a high frequency component.

Therefore, the restricted range calculation unit 104 according to the present embodiment, for example, calculates a restricted range such that a medium frequency component in which the above described the low frequency component and the high frequency component are excluded is not included in the restricted range.

Figure 11:
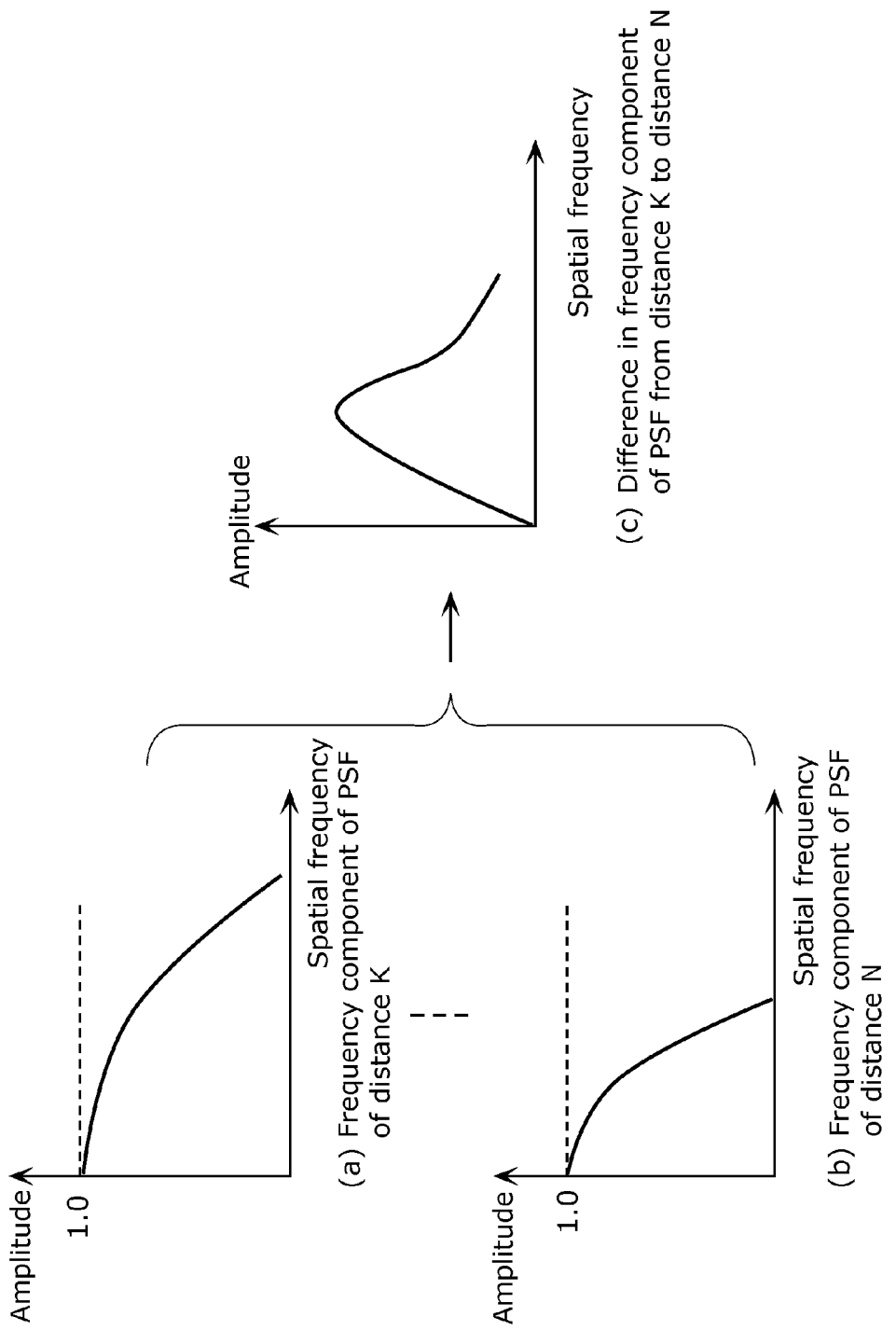
FIG. 11 is a diagram showing a difference for each of the frequency components of the PSF.

FIG. 11, in (c), shows a difference value obtained by subtracting the minimum amplitude value from the maximum amplitude value in each of the spatial frequencies of the PSF for each of the distances from the distance K to the distance N. The restricted range calculation unit 104 calculates a restricted range which more likely excludes the spatial frequency when the difference value is larger at the spatial frequency With this, it is easier for the distance estimation unit 207 to specify the distance.

As another item for determining the distance specification accuracy, the S/N ratio for each of the spatial frequencies of the input image should also be considered. For example, even in the case of the medium frequency component in which a distance is easy to be specified and in the case of a spatial frequency having a low S/N ratio of the input image, the specification of the distance in the spatial frequency is not accurate.

Therefore, in the present embodiment, the restricted range calculation unit 104 calculates a distance specification value as a measure to show the distance specification accuracy from the two items. For example, the distance estimation unit 207 calculates a distance specification value for each of the frequency components like (c) of FIG. 12 from the difference value of the frequency component of the PSF within the distance interval like (a) of FIG. 12 and the S/N ratio for each of the frequency components as shown in (b) of FIG. 12. Specifically, the restricted range calculation unit 104 calculates, for example, the product of two frequency components as a distance specification value. The distance specification value shows that when the value is higher, the distance specification accuracy is higher.

The restricted range calculation unit 104 calculates a restricted range using the distance specification value. In other words, the restricted range calculation unit 104 calculates a restricted range which more likely includes a spatial frequency (i) when the S/N ratio is lower at the spatial frequency, and (ii) when the difference between frequency components is smaller at the spatial frequency in a plurality of frequency characteristics of the PSFs stored in the distance information database 308.

Figure 12:
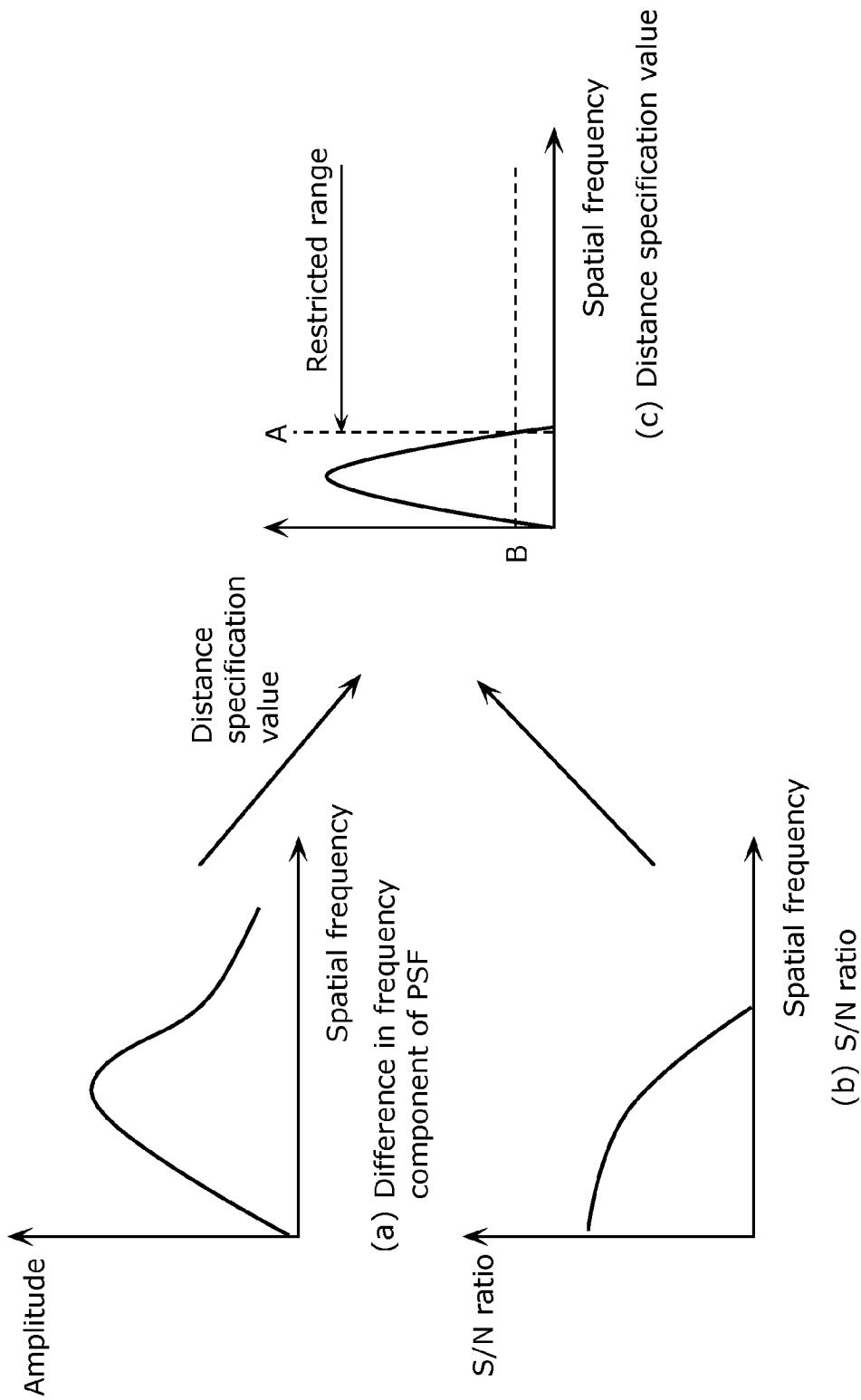
FIG. 12 is a diagram showing a distance specification value for each of the frequency components.

For example, the restricted range calculation unit 104 sets, as a restricted range, a frequency range which determines the frequency A as the lower limit when the distance specification value matches a threshold B set by the user in (c) of FIG. 12. Moreover, for example, the restricted range calculation unit 104 may set, as a restricted range, the frequency range having the distance specification value less than a threshold. Moreover, in the present embodiment, since the imaging unit 101 captures a plurality of input images, the restricted range calculation unit 104 merges the restricted ranges calculated for the input images.

When the difference value of the frequency component of the PSF is smaller, the distance specification value is smaller. Therefore, the lower limit of the restricted range has a frequency that is lower than the lower limit calculated only by the S/N ratio. As a result, the number of the frequency components restricted by the frequency restriction unit 105 is increased.

The PSF estimation unit 106 estimates PSF for each of the ranges in the input image, using the restricted image generated by the frequency restriction unit 105 and the frequency characteristics obtained from the distance information database 308.

More specifically, the PSF estimation unit 106 estimates PSF for each of the ranges in at least one input image, based on a plurality of restricted images obtained from a plurality of input images having different focuses. For example, the PSF estimation unit 106 estimates PSF for each of the ranges in a blurred image that is not focused, based on an all-in-focus image that is focused. Moreover, in the present embodiment, the PSF estimation unit 106, different from that according to Embodiments 1 and 2, selects any one of a group of the PSFs having predetermined shapes (a plurality of PSFs). The group of PSFs having predetermined shapes is the same as the PSFs stored in the distance information database 308. For example, when the interval from the distance K to the distance N in FIG. 10 is determined as the distance interval to be set by the user, the PSF estimation unit 106 estimates PSF by selecting any one of the PSFs for the distances measured within the interval from the distance K to the distance N.

Here, the PSF estimation unit 106 calculates the difference between (i) the restricted image of the first input image and (ii) the convolution image obtained through performing a convolution operation, using the PSF stored in the distance information database 308, on the restricted image of the second input image having a blur that is smaller than that of the first input image. The PSF estimation unit 106, based on the calculated difference, estimates the PSF of the first input image by selecting one of the PSFs stored in the distance information database 308.

More specifically, the PSF estimation unit 106 first calculates the sum of absolute difference between (i) the convolution images obtained by performing a convolution operation using each of the PSFs stored in the distance information database 308 on the restricted image of the all-in-focus image that is focused (the second input image) and (ii) the restricted image of the defocus image that is not focused (the first input image). The PSF estimation unit 106 selects, as the PSF of the defocus image, the PSF corresponding to the convolution image in which the sum of absolute difference is the smallest.

The PSF estimation accuracy is thought to change depending on a distance. Description will be made about the case where the estimation accuracy changes depending on a distance when the distance K to the distance L in FIG. 10 is a distance interval set by the user.

FIG. 13, in (a), shows a difference between the frequency components of the PSF from the distance K to the distance L. Since the distance K to the distance L are near the focal position, the blur radius is small and the difference between the frequency components is concentrated on a high frequency. When the frequency A on the lower limit of the restricted range is set on the side of a low frequency, the frequency component higher than the frequency A for each of the input images is restricted. As a result, the high frequency component on which the difference of the frequency components of the PSF from the distance K to the distance L is concentrated is not included in the restricted image. In this case, the PSF estimation accuracy is reduced in the interval from the distance K to the distance L.

FIG. 13, in (b), shows a difference between the frequency components of the PSF from the distance M to the distance N. Since the distance M to the distance N are far from the focal position, the blur radius is large and the difference between the frequency components is concentrated on a low frequency. In this case, even when the frequency component higher than the frequency A is restricted, the low frequency component on which the difference between the frequency components of the PSF is concentrated from the distance M to the distance N is included in the restricted image. Therefore, the PSF estimation accuracy in the interval from the distance M to the distance N is not reduced.

As described above, the PSF estimation accuracy is thought to be different between a short distance interval and a long distance interval. Therefore, in the present embodiment, in order to be almost equal between the PSF estimation accuracy in the short distance interval and the PSF estimation accuracy in the long distance interval, the PSF estimation unit 106 reduces the total number of the selectable PSFs by merging a plurality of the PSFs stored in the distance information database 308, when the short distance interval is set. For example, when the specification accuracy is low from the distance K to the distance L, the total number of erroneous estimations in the interval from the distance K to the distance L is increased when trying to finely estimating the PSF. In this case, by treating the group of PSFs in the interval from the distance K to the distance L as a single representative PSF (for example, the PSF of the distance L), it is possible to reduce the total number of cases where the PSF is erroneously estimated, although the PSF cannot be finely estimated.

As shown in FIG. 13, when the frequency component higher than the frequency A is restricted, the PSF cannot be finely estimated when the short distance interval is set. Therefore, the PSF estimation unit 106 extends a distance interval corresponding to the PSFs which are merged into a single PSF. Conversely, when the long distance interval is set, the PSF can be finely estimated. Therefore, the PSF estimation unit 106 does not have to extend a distance interval corresponding to the PSFs which are merged into a single PSF.

Here, a method for setting an interval in which PSFs are merged will be described. A method is thought in which the PSF estimation unit 106, for example, determines the sum of difference between the frequency components from the frequency of DC component to the frequency A on the lower limit and extends an interval until the sum exceeds a constant value. A group of PSFs within the set interval are merged into a single representative PSF. For example, the PSF estimation unit 106 merges PSFs by selecting a single representative PSF from the group of the PSFs within the interval.

Since in the distance estimation unit 207, the PSF in which the shape is restricted by the PSF estimation unit 106 is estimated, the total number of distances that can be specified is limited. The total number of distances that can be specified by the distance estimation unit 207 is the same as the total number of PSFs that are previously measured within the distance interval to be set by the user. Moreover, the total number of distances that can be specified by the PSF estimation unit 106 is reduced when a group of PSFs are merged into a single representative PSF.

In other words, the PSF estimation unit 106 merges a plurality of PSFs stored in the distance information database 308 in which when the restricted range is larger, the total number of PSFs to estimate a distance is smaller. As a result, when the restricted range is larger, a group of PSFs are merged and the total number of distances that can be specified is decreased. For example, when there is no restricted range, a group of PSFs are not merged. Therefore, the total number of distances that can be specified is equal to the total number of PSFs that are previously measured within a distance interval. However, when the restricted range is large due to a large amount of noise, the PSF estimation unit 106 merges a group of PSFs and the total number of distances that can be specified is reduced compared with the total number of distances that are not restricted.

Moreover, the PSF estimation unit 106 merges a plurality of PSFs stored in the distance information database 308 in which when the distance is closer to the infocus position, the total number of PSFs corresponding to a vicinity of a position at the distance is smaller. As a result, the merger of a group of PSFs is easier to take place at the object which is located in a short distance and includes a large amount of high frequency component easy to be buried in the noise. Therefore, when the object is located in a short distance, the total number of distances that can be specified is easier to be reduced. It should be noted that the infocus position is a distance between the focal position on the side of the object and the imaging apparatus 100 when the input image is captured.

An imaging apparatus according to one or more embodiments has been described based on the embodiments. However, the present invention is not defined only by the embodiments. Although only some exemplary embodiments have been described in detail above, those skilled in the art will ready appreciate that various modifications may be made in one or more exemplary embodiments of the present invention without materially departing form the principles and sprit of the invention concept, the scope of which is defined in the appended Claims and their equivalents.

For example, an imaging processing apparatus according to an aspect of the present invention may include part of the plurality of structural elements included in the imaging apparatus according to each of the embodiments. The following will describe the image processing apparatus.

Figure 14:
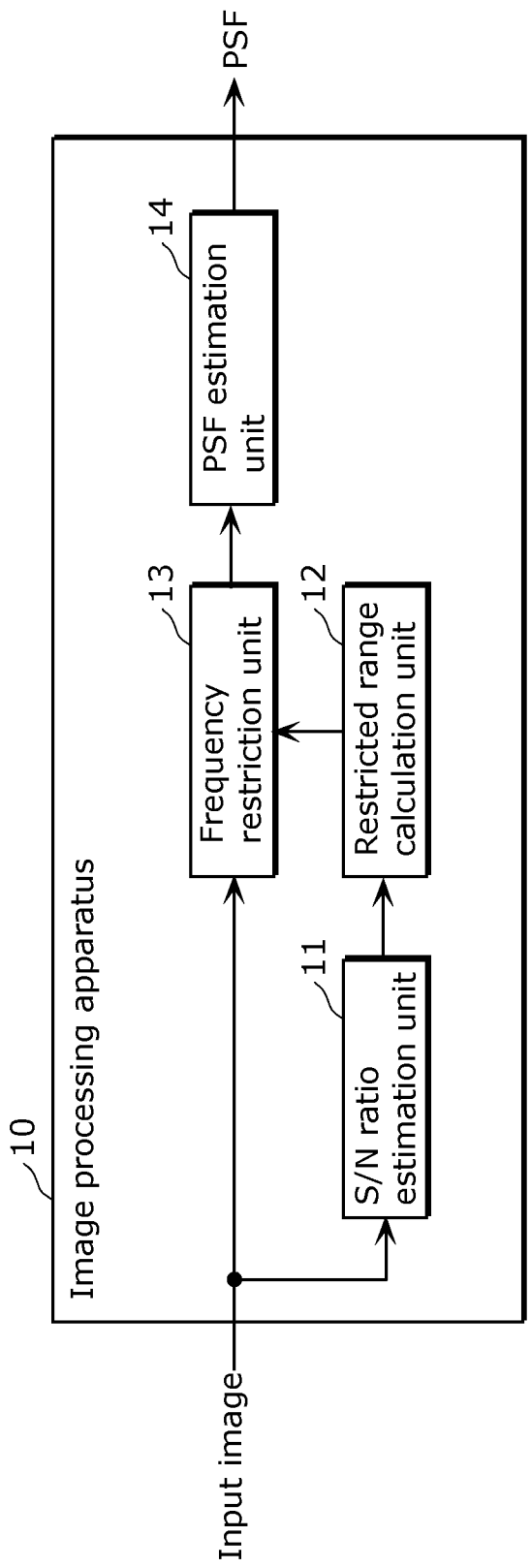
FIG. 14 is a diagram showing a configuration of an imaging processing apparatus according to another embodiment.
Figure 15:
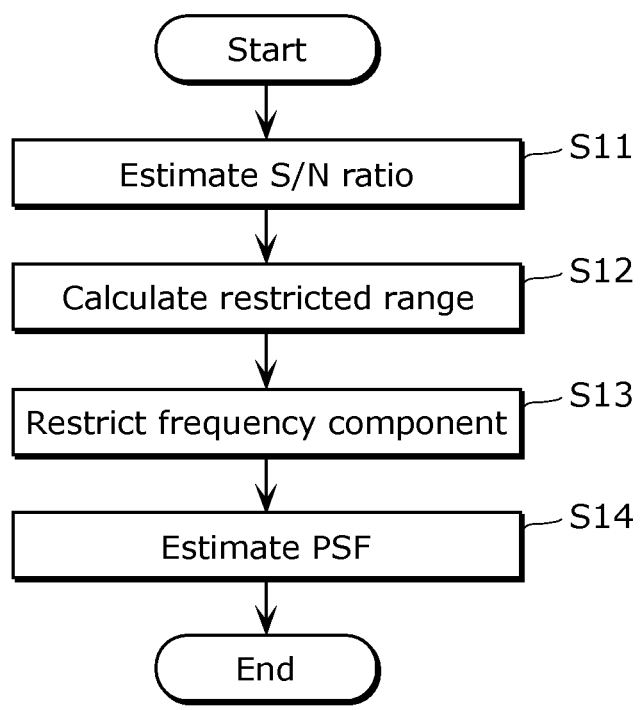
FIG. 15 is a flowchart showing processes performed by the imaging processing apparatus according to another embodiment.

FIG. 14 is a block diagram of an imaging processing apparatus according to another embodiment. FIG. 15 is a flowchart showing processes performed by the imaging processing apparatus according to another embodiment.

An image processing apparatus 10 includes an S/N ratio estimation unit 11, a restricted range calculation unit 12, and a frequency restriction unit 13, and a PSF estimation unit 14.

First, the S/N ratio estimation unit 11 estimates an S/N ratio of an input image for each of the spatial frequencies (S11). Next, the restricted range calculation unit 12 calculates a restricted range which is a range of the spatial frequency in which the frequency component of the input image is restricted and more likely includes a spatial frequency in which the S/N ratio is lower (S12). The frequency restriction unit 13 generates a restricted image by restricting the frequency component of an input image within the restricted range (S13). Finally, the PSF estimation unit 14 estimates the PSF of the input image using the restricted image (S14).

As similarly to the imaging apparatus according to the above described embodiments, the image processing apparatus 10 can also restrict a frequency component of an input image within a restricted range which is calculated for the spatial frequency to be more likely included in the restricted range when the S/N ratio is lower at the spatial frequency. Furthermore, the image processing apparatus 10 can estimate PSF using the restricted image which is restricted in such a manner. Therefore, the image processing apparatus 10 can restrict reduction in the PSF estimation accuracy by a frequency component having a large amount of noise. Furthermore, since the total number of a frequency component for use in estimating PSF is reduced, the image processing unit 10 can reduce the processing load for estimating PSF or shorten the processing time for estimating PSF.

In the above described embodiments, the S/N ratio estimation unit estimates an S/N ratio by estimating each of the signal component and the noise component that are included in the input image. However, it does not necessarily have to estimate the S/N ratio in this way. For example, the S/N ratio estimation unit may estimate the S/N ratio of the input image by selecting the S/N ratio corresponding to the luminance of the input image from a plurality of the S/N ratios that are previously stored in association with the plurality of luminances.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image processing apparatus according to each of the embodiments is a program described below.

In other words, the program is an image processing method for estimating a PSF of at least one input image, and the program causes a computer to perform the image processing method including: estimating an S/N ratio of the input image at each spatial frequency; calculating a restricted range which more likely includes a spatial frequency in which the S/N ratio is lower, the restricted range being a range in which a frequency component of the input image is restricted, the range being of the spatial frequency; generating a restricted image by restricting a frequency component of the input image within the restricted range; and estimating the PSF of the input image, using the restricted image.

The image processing apparatus according to an aspect of the present invention can be applied to a security camera such as a surveillance camera and a monitoring camera, a digital still camera, a digital video camera, or the like.

REFERENCE SIGNS LIST

10 Image processing apparatus
11, 103 S/N ratio estimation unit
12, 104 Restricted range calculation unit
13, 105 Frequency restriction unit
14, 106 PSF estimation unit
100, 200, 300 Imaging apparatus
101 Imaging unit
102 Imaging information database
207 Distance estimation unit
308 Distance information database

The invention claimed is:

1. An image processing apparatus which estimates a point spread function (PSF) of at least one input image, the image processing apparatus comprising:
   a non-transitory memory device storing a program; and
   a hardware processor configured to execute the program and cause the image processing apparatus to function as:
   an S/N ratio estimation unit configured to estimate an S/N ratio of the input image at each spatial frequency;
   a restricted range calculation unit configured to calculate a restricted range which more likely includes a spatial frequency in which the S/N ratio is lower, the restricted range being a range in which a frequency component of the input image is restricted, the range being of the spatial frequency;
   a frequency restriction unit configured to generate a restricted image by restricting a frequency component of the input image within the restricted range; and
   a PSF estimation unit configured to estimate the PSF of the input image, using the restricted image.

2. The image processing apparatus according to claim 1, wherein the restricted range calculation unit is configured to calculate, as the restricted range, a range of a frequency that is higher than a spatial frequency at which the S/N ratio matches a threshold.

3. The image processing apparatus according to claim 1, wherein the restricted range calculation unit is configured to calculate, as the restricted range, a range of a spatial frequency at which the S/N ratio is less than a threshold.

4. The image processing apparatus according to claim 1, wherein the PSF estimation unit is configured to estimate the PSF for each range in the input image, and
   the image processing apparatus further comprises a distance estimation unit configured to estimate a distance in a captured scene of the input image, using the PSF estimated for each range.

5. The image processing apparatus according to claim 4, further comprising
   a distance information database which stores a plurality of frequency characteristics of PSFs including the PSF each corresponding to one of a plurality of distances,
   wherein the restricted range calculation unit is configured to calculate the restricted range for including the spatial frequency in the restricted range (i) when the S/N ratio is lower at the spatial frequency and (ii) when a difference between frequency components in the frequency characteristics of the PSFs stored in the distance information database is smaller at the spatial frequency.

6. The image processing apparatus according to claim 4, further comprising
   a distance information database which stores a plurality of frequency characteristics of PSFs including the PSF each corresponding to one of a plurality of distances,
   wherein the at least one input image includes a first input image, and a second input image which is less blurred than the first input image, and
   the PSF estimation unit is configured to:
   calculate a difference between (i) a restricted image of the first input image and (ii) a convolution image obtained by performing a convolution operation using the PSF stored in the distance information database on a restricted image of the second input image; and
   estimate a PSF of the first input image by selecting one of the PSFs stored in the distance information database, based on the calculated difference.

7. The image processing apparatus according to claim 1,
wherein the S/N ratio estimation unit is configured to estimate:
a signal component of the input image at each spatial frequency, based on at least one of a frequency characteristic of a lens used in capturing the input image and a frequency characteristic of an object included in the input image;
a noise component of the input image at each spatial frequency, based on a frequency characteristic of noise in an imaging element used in capturing the input image; and
an S/N ratio of the input image at each spatial frequency, by calculating a ratio of the signal component to the noise component for each spatial frequency.

8. The image processing apparatus according to claim 7, further comprising
an imaging information database which stores a plurality of frequency characteristics of noise each corresponding to one of a plurality of luminance values,
wherein the S/N ratio estimation unit is configured to obtain, from the imaging information database, the frequency characteristic of the noise corresponding to one of the luminance values of the input image, and to estimate the noise component of the input image at each spatial frequency, based on the obtained frequency component of the noise.

9. The image processing apparatus according to claim 7,
wherein the at least one input image includes a plurality of input images, and
the S/N ratio estimation unit is configured to estimate a signal component at each spatial frequency from an input image having a small blur radius among the input images.

10. The image processing apparatus according to claim 2,
wherein the frequency restriction unit is configured to restrict a frequency component of the input image within the restricted range by reducing the input image in size.

11. The image processing apparatus according to claim 1,
wherein the frequency restriction unit is configured to restrict a frequency component of the input image within the restricted range by calculating a frequency component at only a spatial frequency out of the restricted range in frequency conversion on the input image.

12. The image processing apparatus according to claim 1,
wherein the at least one input image includes a plurality of input images,
the restricted range calculation unit is configured to calculate the restricted range for each of the input images and merge the calculated restricted ranges into a single restricted range, and
the frequency restriction unit is configured to restrict a frequency component for each of the input images, using the merged single restricted range.

13. The image processing apparatus according to claim 4,
wherein the distance estimation unit is configured to:
merge a plurality of PSFs stored in the distance information database in which when the restricted range is larger, a total number of PSFs for estimating a distance is smaller; and estimate the distance using the merged PSF.

14. The image processing apparatus according to claim 4,
wherein the distance estimation unit is configured to:
merge a plurality of PSFs stored in the distance information database in which when a distance is closer to an infocus position, a total number of PSFs corresponding to a vicinity of a position at the distance is smaller; and estimate the distance using the merged PSF.

15. The image processing apparatus according to claim 1,
wherein the image processing apparatus is configured as an integrated circuit.

16. An imaging apparatus which captures an input image, the imaging apparatus comprising
the image processing apparatus according to claim 1.

17. An image processing method performed by an image processing apparatus for estimating a point spread function (PSF) of at least one input image, the image processing method comprising:
estimating an S/N ratio of the input image at each spatial frequency;
calculating a restricted range which more likely includes a spatial frequency in which the S/N ratio is lower, the restricted range being a range in which a frequency component of the input image is restricted, the range being of the spatial frequency;
generating a restricted image by restricting a frequency component of the input image within the restricted range; and
estimating the PSF of the input image, using the restricted image,
wherein the image processing apparatus includes a non-transitory memory device storing a program, and a hardware processor configured to execute the program and cause the image processing apparatus perform the image processing method.

18. A non-transitory computer-readable recording medium having a program recorded thereon for causing a computer to execute the image processing method according to claim 17.

* * * * *